United States Patent [19]
Frisch

[11] Patent Number: 5,336,693
[45] Date of Patent: Aug. 9, 1994

[54] EMBOSSING COMPOSITION FOR PREPARING TEXTURED POLYMERIC MATERIALS

[75] Inventor: Rudolf Frisch, Yardley, Pa.

[73] Assignee: Congoleum Corporation, Mercerville, N.J.

[21] Appl. No.: 983,119

[22] Filed: Nov. 30, 1992

Related U.S. Application Data

[63] Continuation of Ser. No. 759,837, Sep. 13, 1991, abandoned, which is a continuation of Ser. No. 118,973, Nov. 10, 1987, abandoned.

[51] Int. Cl.$^5$ ................................ C08J 9/18
[52] U.S. Cl. .............................. 521/72; 521/91; 521/94; 428/158; 428/159; 428/913; 428/914; 106/20 C; 106/22 H; 106/23 H; 264/46.4; 264/52; 264/DIG. 5; 264/DIG. 82
[58] Field of Search ................ 521/72, 91, 94; 428/158, 159, 913, 914; 106/20, 22, 23; 264/46.4, 52, D5, D82

[56] References Cited

U.S. PATENT DOCUMENTS

| | | | |
|---|---|---|---|
| 3,293,094 | 12/1965 | Nairn et al. | 156/79 |
| 3,533,811 | 10/1970 | Clements et al. | 106/24 |
| 4,083,907 | 4/1978 | Hamilton | 264/52 |
| 4,111,878 | 9/1978 | Ruhf | 524/376 |
| 4,191,581 | 3/1980 | Hamilton | 106/20 |
| 4,369,065 | 1/1983 | Brixius | 106/27 |
| 4,401,611 | 8/1983 | Mansolillo et al. | 264/46.4 |
| 4,407,882 | 10/1983 | Hauser et al. | 428/159 |
| 4,421,561 | 12/1983 | Brixius | 106/27 |
| 4,482,598 | 11/1984 | Ishii et al. | 428/195 |

*Primary Examiner*—Samuel A. Acquah
*Attorney, Agent, or Firm*—Synnestvedt & Lechner

[57] ABSTRACT

A water-based embossing composition for use in chemically embossing a foamable polymeric material having a blowing agent incorporated therein comprising: (A) a film-forming resin dissolved or dispersed in said aqueous composition; (B) a modifier which is effective in modifying the activity of the blowing agent comprising particulate solids which are substantially insoluble and uniformly dispersible in the liquid medium of the embossing composition and which have an average particle size of no greater than about 100 microns, said modifier being present in the composition in an amount of at least about 3 wt. %; and (C) optionally, a colorant or a softening agent for the modifier solids or a mixture thereof.

45 Claims, No Drawings

EMBOSSING COMPOSITION FOR PREPARING TEXTURED POLYMERIC MATERIALS

This is a continuation of copending application Ser. No. 07/759,837, filed Sep. 13, 1991, now abandoned, which is a continuation of Ser. No. 07/118,973 filed on Nov. 10, 1987, now abandoned.

FIELD OF THE INVENTION

This invention relates to an embossing composition for use in preparing chemically textured polymeric substrates, including use of the embossing composition for treating foamable polymeric compositions in the production of embossed, foamed polymeric substrates, especially textured floor coverings. In particular, the invention relates to an environmentally acceptable, aqueous-based embossing composition which has uniform embossing characteristics, good storage stability, and good rheological properties. The embossing composition is especially suitable for use in conjunction with standard apparatus for printing a foamable polymeric composition.

The use of the embossing composition of the present invention is exemplified herein in connection with the production of foamed, textured floor coverings, especially vinyl sheet goods. The compositions are also broadly useful in a variety of other applications, as described hereinbelow.

Embossing compositions for chemically embossing foamable polymeric compositions are well-known in the art. Such compositions were developed primarily for use in the production of textured floor coverings and similar sheet materials, as described, for example, in U.S. Pat. No. 3,293,094, issued to Nairn et al on Dec. 20, 1966, and incorporated herein by reference. As disclosed in this patent, a foamed, textured polymeric material is produced from a foamable polymeric composition having a blowing agent incorporated therein by selective application to the surface of the composition of a modifier which affects the activity of the blowing agent in either a direct or an indirect fashion. For example, in a typical process for producing a textured floor covering, a plastisol containing a blowing agent is applied to a backing and heat-treated to convert the plastisol to a foamable composition usually referred to as a "gel" under conditions which do not activate the blowing agent. An embossing composition containing a modifier for the blowing agent is applied to the gel, usually to selected portions thereof in a predetermined pattern. This is accomplished typically by applying the embossing composition to the gel by use of a rotogravure printing cylinder.

Thereafter, the printed or coated gel is treated to activate the blowing agent which expands to effect differential foaming or expansion of the gel due to the presence of the modifier on selected portions of the gel. This results in the production of an embossed or textured pattern in the gel which is thereafter fused.

Modifiers having various functions are known, including modifiers which promote or inhibit activity of the blowing agent per se or which promote or inhibit activity of a catalyst or accelerator which is admixed with the blowing agent in the gel. Typically, the modifiers are patterned on the gel as liquid formulations having the rheological characteristics required for the particular application. The essential ingredients of such liquid formulations are the modifier and a film-forming resin which is dissolved or dispersed in the liquid phase of the formulation and which functions as a binder as the formulation dries. In addition, the formulation usually contains a colorant, for example, an ink, pigment or dye, which imparts color to the design of the textured pattern. Such a liquid formulation which comprises a modifier and a film-forming resin and optionally a colorant is known in the art as an "embossing composition" and is so referred to herein.

From the time that textured floor coverings of the aforementioned type were first introduced to the marketplace (over 20 years ago) until the present, the only type of embossing compositions used commercially in the U.S. to prepare such products have been and remain those based on the use of a hydrocarbon liquid as a solvent and/or carrier for the other ingredients comprising the embossing composition. Such a composition is referred to typically in the industry as an "organic-based embossing composition" and can comprise about 55 to about 85 wt. % or more of the hydrocarbon liquid.

Although such compositions function well in the process for manufacturing textured floor coverings, there are concerns respecting the effects such organic materials have on workers and on the environment into which they are discharged. Indeed, the concerns have led to governmental regulations which control strictly the amount of such materials that can be discharged into the environment. Although many millions of dollars have been invested by the industry in equipment for reducing the amount of such organic materials discharged into the atmosphere, present day technology is such that it is not possible in a practical sense to avoid completely such discharge. It is believed that continued discharge of organics is tolerated by environmentalists only because a satisfactory alternative is and has not been available.

One alternative that has been explored involves substituting water for the hydrocarbon liquid used in the embossing composition and it is to such water-based embossing compositions that the present invention is related.

REPORTED DEVELOPMENTS

The following patents disclose aqueous-based embossing compositions.

U.S. Pat. No. 4,083,907 and related U.S. Pat. No. 4,191,581, each to Hamilton and assigned to the same assignee as the present invention, discloses an aqueous-based embossing composition having a pH of about 8 to about 12 and containing: about 1 to about 15 wt. % of a modifier (referred to in the patent as a "foam-growth-controlling chemical agent"); about 1 to about 9 wt. % of a water-soluble or water-dispersible alcohol, for example, isopropanol; about 1 to about 11 wt. % of a buffering agent, for example, ammonia; about 30 to about 75 wt. % of an aqueous printing ink formulation; and about 10 to about 40 wt. % of added water. Modifiers disclosed in this patent include triazoles, for example, benzotriazole and various aminotriazoles. Such compounds are normally solid materials that are solubilized in the alkaline composition by the alcoholic constituent.

U.S. Pat. No. 4,369,065 and related U.S. Pat. No. 4,421,561 to Brixius discloses an aqueous embossing composition having a pH of about 8 to about 12 and containing: 1 to about 25 wt. % of a modifier, namely an organic carboxylic acid containing 2 to 12 carbon atoms, an anhydride of such acid, or an acid halide of such acid; about 3 to about 45 wt. % of an aqueous printing ink formulation; about 1 to about 25 wt. % of a basic neutralizing agent, for example, ammonia; and about 1 to about 10 wt. % of a pH controlling agent, for example, boric acid-sodium tetraborate. The patent discloses that a particularly preferred modifier is trimellitic acid anhydride.

U.S. Pat. No. 4,407,882 to Hauser and Eckert discloses an aqueous embossing composition comprising: as a modifier, about 2 to about 20 wt. % of a particular type of azole (referred to in the patent as a "foam inhibitor"); 1 to 10 wt. % pigment; 15 to 40 wt. % of a thermoplastic resin, for example, poly(vinyl chloride); and 5 to 25 wt. % of an organic solvent, for example, isopropanol.

Notwithstanding the developments described in the aforementioned patents, the commercial use of aqueous-based embossing compositions has been frustrated for a variety of reasons. Difficulty has been encountered in solubilizing in the aqueous compositions modifiers in amounts sufficient to achieve concentrations of modifiers in the embossing compositions to adequately and effectively treat the areas to be embossed. For example, some triazoles commonly employed as modifiers are substantially insoluble in acidic medium. Consequently, such modifiers are commonly used only in alkaline solution. Inasmuch as highly alkaline solutions promote electrochemical attack on metals frequently used in embossing rolls, such solutions are not useful as a practical matter in these applications using this machinery.

Additionally, many known modifiers have limited solubility even in alkaline solutions. Accordingly, substantially uniform application of these modifiers from the embossing composition to the underlying blowing agent-containing gel in sufficiently high concentrations to provide a well-defined embossing effect cannot be achieved readily. Attempts have been made to promote solubility of these modifiers in both acidic and alkaline aqueous solutions by addition of organic solvents, especially water-miscible organic solvents such as lower (for example, $C_1$-$C_6$) alkanols. Often, however, adequate solubilization of the modifier is only achieved at the expense of optimum rheological characteristics. Typically, viscosity of the embossing composition is reduced below that required for printing, necessitating the addition of thickeners. Thickeners, in turn, tend to interfere with printing characteristics to an extent determined by the particular components and substrate.

The aforementioned Hamilton, Brixius, and Hauser et al patents describe aqueous embossing compositions which comprise the modifier in solution form. The Hamilton patent contains an additional disclosure that the modifier is also "dispersible" in the aqueous-alcoholic embossing composition, alcohol being an essential constituent of the Hamilton composition. An analysis of all of the examples in the Hamilton patent shows that the modifier is present in each of the exemplified embossing compositions in dissolved form. For this purpose, the weight proportion of solvent (alcohol) to modifier is relatively high, for example, falling within the range of 0.58 to 1.5 times as much solvent as modifier or 37 to 60 wt. % of solvent based on the weight of the solvent and modifier. The use of such compositions results in problems and is accompanied by disadvantages of the type discussed above.

The present invention relates to improved environmentally acceptable, water-based embossing compositions which are capable of being used industrially with but relatively limited changes to presently used manufacturing lines, particularly rotogravure printing lines.

SUMMARY OF THE INVENTION

In accordance with the present invention, it has been found that an improved water-based embossing composition can be formulated by use of a water-insoluble modifier which is present in the composition in the form of fine solid particles of sufficiently small size to permit the modifier to be uniformly dispersed in the composition in an effective amount and in the absence of a material which is effective in solubilizing the modifier, for example, a solvent such as the alcoholic solubilizing agent of the type referred to in the aforementioned Hamilton and Hauser et al patents. In addition to modifier and water, another essential constituent of the composition of the present invention is a film-forming resin dissolved or dispersed in the aqueous medium of the composition.

In preferred form, the water-based embossing composition of the present invention includes also a material which is effective in softening the solid particles of modifier. Such a material, referred to herein as a "softening agent", improves various properties of the embossing composition, as is described hereinbelow, by rendering the particles malleable or pliable. The amount of softening agent in the composition is small relative to the amount of particles of modifier, for example, about 25% or less of softening agent based on the total weight of the softening agent and modifier. Preferred softening agents include amines and alcohols, the last mentioned being particularly preferred.

In accordance with another aspect of the present invention, there is provided a water-based embossing composition for use in chemically embossing a foamable polymeric material having a blowing agent incorporated therein comprising:

(A) a film-forming resin dissolved or dispersed in the aqueous medium of said composition;

(B) a modifier which is effective in modifying the activity of the blowing agent and which comprises particulate solids substantially insoluble and uniformly dispersible in the liquid medium of the embossing composition and having an average particle size of no greater than about 100 microns, said modifier being present in the composition in an amount of at least about 3 wt. %; and (C) optionally, a colorant and/or softening agent.

The preferred modifier for use in the practice of the present invention is a triazole, most preferably benzotriazole or tolyltriazole.

In particularly preferred form, the average particle size of the modifier is no greater than about 75 microns and is most preferably in the range of about 40 to about 75 microns.

It is believed that the invention will be used most widely in connection with a composition that includes a colorant, and particularly one added to the composition in the form of an aqueous printing ink.

In accordance with another aspect of this invention, there is provided a method for preparing a foamable polymeric material capable of being chemically embossed comprising:

(A) providing a foamable polymeric material comprising a resin and a blowing agent capable of effecting expansion of said material at elevated temperature;

(B) applying to predetermined portions of the surface thereof a water-based liquid embossing composition comprising a modifier which is effective, as the treated material is heated, for modifying the activity of the blowing agent in those portions of the material to which the embossing composition is applied, said modifier being in the form of fine solid particles of sufficiently small size to render the modifier uniformly dispersed in the liquid medium of said composition; and (C) drying the embossing composition after it has been applied to said surface.

In preferred form, the method of the present invention involves the presence in the foamable polymeric material of a blowing agent and an accelerator for the blowing agent, and the use of a modifier which renders the accelerator at least partially ineffective.

The present invention provides numerous advantages relative to prior art means involving the use of water-based embossing compositions in the manufacture of textured articles. Such advantages flow from the use of a blowing agent modifier in finely divided solid form. The use of such finely divided particles permits the manufacturer to incorporate relatively large amounts of the modifier in the embossing composition without adversely affecting other desired properties of the composition such as, for example, viscosity properties. This is important because there are applications where relatively high amounts of modifier are needed (for example, in excess of 30% by weight of the composition). Another advantage of the present invention is that desired amounts of the modifier can be incorporated into the composition without having to take into account the pH of the composition. This gives the user much greater flexibility in selecting other constituents for use in the composition and greater flexibility in selecting manufacturing parameters.

Another important aspect of the present invention is that the embossing compositions retain desired modifying properties for long periods of time, typically at least about 2 months, as compared to prior art aqueous embossing compositions which may have storage stability of no more than about 1 week. Developmental work has shown that such properties are retained for periods of many weeks and even as long as six months or more. In this connection, and by way of background, it is noted that there are applications where there may be long periods of time that pass between the making of the embossed foamable polymeric material and the time when the material is treated further to activate the blowing agent and expand the material and convert it into a finished product.

Experience has shown that various types of prior art embossing compositions lose their modifying properties as they age, that is, the modifier tends to lose its ability to change the activity of the blowing agent. This limits the use of printed foamable polymeric material of the type heretofore known. Such problems can be avoided by practice of the present invention.

The excellent stability properties of the embossing composition render it highly suitable for use in a transfer printing process, a particular type of heretofore known printing method, as described below. Accordingly, another aspect of the present invention encompasses a transfer printing sheet for use in a transfer printing process, said sheet comprising a support sheet having adhered thereto in a predetermined pattern an embossing composition of the present invention, the support sheet being strippable from said composition. The long-term stability properties of the present embossing composition are particularly advantageous and critically important to its use in a transfer printing sheet.

Other advantages which flow from the use of the present invention will be appreciated from the following detailed description of the invention.

DETAILED DESCRIPTION OF THE INVENTION

The essential ingredients of the liquid embossing composition of the present invention are: (A) water; (B) a film-forming resin dispersed or dissolved therein; and (C) a blowing agent modifier in finely divided solid form. Optionally, the embossing composition includes a colorant and conventional additives, and also a softening agent, which although optional is a highly preferred constituent.

Many species of the film-forming resin and modifier for use in embossing compositions of the present invention are known and have been proposed for use in embossing compositions, for example, as described in each of the patents mentioned above. Building on such prior art disclosures, the unique aspects of the present invention can be used to advantage in a variety of embossing compositions of the type which can be used to print patterns on the surface of foamable polymeric materials.

As known, the film-forming resinous constituent of the embossing composition functions as a binder for other ingredients comprising the composition. Typically, the film-forming resin will be present in the composition in dissolved form or, as is more typically the case, in the form of solid particles of resin which are dispersed in the composition. Latexes, that is, aqueous compositions containing solid particles of resin dispersed in water are used widely in formulating embossing compositions. Examples of film-forming resins which can be used in the practice of the present invention include vinyl and acrylic resins such as, for example, poly(vinyl chloride), poly(vinylidene chloride), copolymers of vinyl chloride and vinyl acetate, poly(vinyl alcohol), ethylene acid copolymers, polyacrylates, polymethacrylates, and polymers of acrylic acid and methacrylic acid, and also polyurethanes and melamine resins. A mixture of film-forming resins can be used in the embossing composition.

As mentioned above, it is believed that the present invention will be used most widely in that form of composition which includes a colorant. However, there are applications where the embossing composition contains no colorant, in which case a clear film can be formed from the composition. As described below, a clear film can be formed from a commercial printing ink which is referred to in the industry as a "clear" or "reducing clear" which contains no colorant.

The modifier for use in the present invention is a material which directly or indirectly affects the activity of the blowing or foaming agent in the foamable polymeric material which is contacted with the embossing composition. The modification of the activity of the blowing agent can be effected by having the modifier act directly on the blowing agent or on a material which itself has an influence on the blowing agent, for example, a catalyst, accelerator or inhibitor that is present in the foamable polymeric material. It should be appreciated that the particular modifier selected for use in an application will depend on the particular blowing agent used in the foamable polymeric material or particular catalyst, accelerator or inhibitor that may be used with the blowing agent. Such selection can be made in accordance with information known to those in the art. An extensive discussion of factors influencing such selection appears in the aforementioned Nairn et al patent.

The present invention encompasses the use of any modifier that is substantially insoluble in the liquid medium of the embossing composition and that is capable of being reduced to a particle size sufficiently small to enable the modifier to be uniformly dispersed in the composition. The term "substantially insoluble" means that no more than about 3 wt. % of the modifier is soluble in the water-based liquid medium of the composition at room temperature (72° F.). Typically, the water solubility of the modifier at room temperature is even lower, for example, no greater than about 1 wt. %.

It should be appreciated that the solubility of materials in aqueous medium can vary depending on the pH of the medium. One of the disadvantages attendant with the use of prior art embossing compositions is that compounds particularly suitable for use as modifiers do not have good solubility characteristics at pH values that are advantageous to use. For example, it is more desirable to use a neutral or acidic embossing composition than an alkaline embossing composition in an application which involves the use of rotogravure printing cylinders because of the tendency of an alkaline composition to degrade the metal comprising such cylinders. However, particularly effective modifiers such as triazoles have poor solubility properties in an acid to neutral embossing composition, and accordingly, the proposed use of such modifiers in soluble form in accordance with prior art teachings is restricted to alkaline embossing compositions. To obtain the desired solubility properties, while making efforts to avoid degradation of the cylinders, requires the exercise of careful control and implementation of special techniques. Such requirements dictate against industrial use.

Pursuant to the present invention, it is not necessary to take into account the pH of the embossing composition in connection with the effective incorporation of the modifier into the embossing composition. Accordingly, the pH value of embossing compositions of the present invention can vary over a broad range and from acidic to basic.

Reference is made to the aforementioned Nairn et al patent (U.S. Pat. No. 3,293,094) which contains an extensive description of compounds of the type that can be used to modify the "blowing" properties of a blowing agent which is present in a foamable resinous composition from which an embossed, foamed, polymeric article can be made. Such compound is referred to in this patent as a "regulator" or an "inhibitor". The term "modifier", as used herein, encompasses compounds of the type which function in the manner described in the Nairn et al patent.

The Nairn et al patent discloses also that the particular modifier selected for use in an application depends on the nature of the blowing agent or of the blowing agent system that is used and sets forth guidelines for selection. Among the classes of compounds disclosed by Nairn et al for use as modifiers in embossing compositions are the following: organic acids, for example, those containing at least two carboxyl groups or those having at least one carboxyl group and one hydroxy group and which contain 2-12 carbon atoms; organic acid halides and anhydrides, for example, those which contain 2-20 carbon atoms; polyhydroxy alcohols, for example, polyhydroxy aromatic compounds which contain 2 hydroxy groups and up to 20 carbon atoms; nitrogen-containing compounds, for example, amines, amides, and oximes; sulphur-containing compounds, for example, thiols, mercaptans, sulfides, sulfones, sulfoxides, sulfonic acids, sulfonyl chloride; suolfonamides, and sulfimides; isocyanates, for example, mono- and di-isocyanates; ketones and aldehydes; for example, those containing two functional groups; and phosphate and phosphite compounds. The Nairn et al patent discloses still additional examples of modifiers of a miscellaneous type, for example, at Column 17, lines 11-55. Modifiers which are described as being particularly useful in water-based embossing compositions are the subject of the aforementioned Hauser et al patent. The modifiers disclosed in this patent are azoles of a particular type.

Preferred modifiers for use in accordance with the present invention include: triazoles, including aminotriazoles, azoles, hydroquinone and thiourea.

In preferred form, the present invention comprises the use of a modifier which is effective in indirectly modifying the activity of the blowing agent by reducing at least partially the effectiveness of an accelerator which is present as a constituent of the blowing agent system present in the composition comprising the foamable polymeric material. An accelerator can function in various ways to modify the activity of the blowing agent. For example, it can accelerate decomposition of the blowing agent, or it can reduce the temperature at which the blowing agent decomposes, or it can narrow the temperature range over which the blowing agent decomposes to reduce the temperature at which the blowing agent is activated.

A highly preferred modifier/blowing agent system recommended for use in the practice of the present invention comprises benzotriazole or tolyltriazole as the modifier and a blowing agent system which includes azodicarbonamide as the blowing agent and zinc oxide as the accelerator.

With respect to particle size of the modifier, the minimum size of the particles is determined basically by considerations associated with having the modifier present in the composition in solid form and with the practicalities and economics of making the modifier in a fine size form which is dispersible, but not soluble. With respect to maximum size, the finely-divided modifier should be capable of forming a relatively stable and uniform suspension or dispersion in the composition to permit substantially uniform application of modifier to the surface of the foamable polymeric material as the embossing composition is applied thereto via the desired printing means. For a particular modifier and/or particular application, maximum and minimum particle size can best be determined by empirical means. It is believed that many applications will benefit by the use of a modifier having an average particle size of no greater than about 100 microns. Based on present work, it is preferred that the average particle size of the modifier be not greater than about 75 microns, for example, about 10 to about 75 microns, and most preferably, the average size is within the range of about 40 to about 75 microns.

The modifier can be incorporated into the composition in various ways. For example, coarse particles of the modifier can be milled into a reducing clear to form a viscous liquid or thick paste, depending on the amount of modifier used. This concentrate of resin and modifier can then be used to prepare the desired embossing composition by admixing therewith pigments and other desired ingredients. A clear embossing composition can be prepared by adding to the modifier/clear concentrate additional resin in an amount sufficient to produce the desired final composition. Alternatively, coarse particles of modifier can be subjected to a micronizing process to reduce the size of the particles to the desired fineness. The modifier in fine powder form can then be added directly to and mixed with the other ingredients comprising the embossing composition.

As mentioned above, an optional but highly preferred constituent of the present invention is a softening agent which functions to render the solid particles of modifier pliable or malleable. The use of the softening agent improves the printing qualities of the embossing composition. It is believed that such improvements are achieved at least in part because the pliable particles can be squeezed more effectively into the cells of printing cylinders. This improves the uniformity of the application of the embossing composition to the foamable gel. It has been observed also that the use of the softening agent avoids streaking of the embossing composition after it has been contacted with a doctor blade of the type used in conventional printing apparatus.

In addition, the flow properties of the embossing composition are generally improved as a result of the use therein of the softening agent.

Typically, the softening agent is a liquid material which is soluble or miscible in the liquid phase of the embossing composition, and is absorbable by the solid particles of modifier. The absorbed softening agent tends to swell the solid modifier particles. Examples of softening agents that can be used are amines and alcohols, the last mentioned class of compounds being preferred. Preferred alcohols for the use of the practice of the present invention contain 1 to about 6 carbon atoms, for example, methanol, ethanol, propanol, butanol, pentanol, and hexanol, including various of the isomers thereof. Examples of amines that can be used include alkylamino-alcohols, exemplary of which are 2-dimethylaminoethanol, 2-methylaminoethanol and 2-ethylaminoethanol. Other hydrocarbon miscible or soluble liquids which do not adversly affect the composition or the printing/embossing process and which function to soften the modifier particles can be used also.

The use of such softening agents should be distinguished from the use of alcohols and other "modifier" solvents as disclosed in the prior art, for example, the aforementioned Hamilton and Hauser et al patents. In the techniques of the prior art, alcohols and other materials which are effective modifier solvents are used in amounts sufficient to dissolve the normally solid compounds which function as modifiers. To effect dissolution of the modifiers, the weight proportion of solvent to modifier is relatively high. For example, in the specific compositions disclosed in the Hamilton patent, alcohol comprises 37-60 wt. % of the total amount of alcohol and modifier. Furthermore, the compositions shown in the example section of the Hamilton patent include aminohydroxy compounds which aid in effecting dissolution of the modifier. Accordingly, such compositions comprise a high proportion of organic solvating materials relative to the amount of modifier. Conversely, the compositions described in the Hamilton patent have a relatively small ratio of modifier to alcohol, for example, such compositions containing about 0.7 to 1.7 times as much modifier as alcohol.

In contrast to the teachings of the prior art, the use of softening agents in accordance with the present invention, including those compounds which function in sufficiently high amounts as a solvent for the modifier, comprises an amount which is not effective in dissolving the modifier. For this purpose, the maximum amount of softening agent relative to the amount of modifier is relatively small. Inasmuch as the solvent effect of softening agent on modifier will vary from one softening agent to the next, amounts for use in the practice of the present invention can best be determined for any particular combination of softening agent/modifier by evaluating the effect that the liquid softening agent has on the solid modifier, taking into account the following guidelines. Speaking generally, any perceptible softening of the solid particle of modifier tends to result in improvements so that the minimum amount of softening agent can be that which is effective in softening the solid particles. When using a softening agent which is also a solvent for the modifier, the maximum amount of softening agent is an amount less than that which causes dissolution of the solid particles in the water-based composition. Otherwise, the maximum amount can be dictated by a levelling off of improvements or adverse effects which may be encountered. As a further guideline, it is recommended that the amount of softening agent comprise at least about 1 wt. % of the composition based on the total weight of the composition, and that the composition contain at least about 3.5 times as much modifier as softening agent. For most applications, it is believed that it will not be necessary to use more than about 5 wt. % of the softening agent based on the total weight of the composition. In preferred form, the softening agent comprises about 2 to about 4 wt. % of the total weight of the composition, and the composition includes at least about 5 times as much modifier as softening agent. It should be understood that variations in the foregoing amounts may need to be made for a particular softening agent/modifier combination for reasons mentioned above.

It should be appreciated that by using the softening agent in the relatively small amounts described herein, there are achieved not only functional improvements in the printing process, but there are avoided various problems associated with the use of the high proportions of solvent according to prior art teachings. For example, in connection with the use of an alcohol solvent as described by Hamilton, alcohol can function to significantly depress the viscosity of the embossing composition causing it to become thin, this in turn causing it to produce a wormy, printed image of poor resolution. Various of the alkanolamines that are disclosed in the aforementioned Hamilton patent can function to slow the drying of the embossing composition. To compensate for this, it is necessary to decrease the line speed of the printing operation. Such undesirable characteristics and adjustments can be avoided by practice of the present invention.

As mentioned above, it is believed that the present invention will be used most widely in connection with embossing compositions which contain a colorant, for example, in the form of a pigment (inorganic or organic) or dye. Inasmuch as the composition of the present invention can be used effectively as either an acidic or an alkaline composition, as described more fully below, a wide variety of colorants can be used. Thus, the acid or alkaline sensitivity of the colorant for use in embossing applications becomes much less, if any, a factor, in the practice of the present invention than is the case with prior art water-based embossing compositions.

Examples of pigments that can be used as the colorant are phthalo blue, phthalo green, scarlet red, carbon black, titanium dioxide, zinc sulfide, cadmium sulfide, iron oxide, perionone, and disazo yellow. Examples of dyes that can be used as the colorant are basonyl red-NB 540, neozapon yellow 108, neozapon black X51, and neozapan blue 807.

Colorant-containing embossing compositions and also embossing compositions for use in forming a clear film are typically formulated from a "printing ink" which is usually a proprietary composition sold to the floor covering industry by an ink manufacturer, for example: American Ink Co., Carolina Inks Co., Custom Chemicals, Inc., Gotham Co., GPI-Sun Corp., Inmont Co., Lenape Co., Polytex Corp., RBH Dispersions, Sinclair & Valentine Corp., Strahan Co., and Visol Corp. Printing inks for use in forming a colored film generally comprise an admixture of pigment, film-forming resin solids and water. Clear embossing compositions are conveniently formulated from a commercial printing ink, which as mentioned above, is referred to in the industry as "clear" or "reducing clear" containing no colorant. Colored embossing compositions are conveniently based on clear embossing compositions by incorporation of a colorant. Additives are usually present also in the printing ink, for example, surfactants and emulsifying agents.

For use in the present invention, the printing ink is a water-based composition, and when used, it is a source of at least a portion of the film-forming resin and water constituent of the composition, as well as a source of colorant. Such aqueous printing inks may contain a relatively small amount of hydrocarbon liquid, for example, alcohols or more highly potent organic solvents such as ethers or esters. As mentioned above, such hydrocarbon liquids comprise a relatively small proportion of the composition of the present invention, for example, no greater than about 5 wt. % based on the total weight of the composition, but in no event is such liquid present in an amount which would solubilize the modifier.

The amounts of the aforementioned essential and optional constituents comprising the composition can vary over a wide range. The amount of film-forming resin should be at least sufficient to provide the binding effect that is desired. The amount of modifier should be at least sufficient to provide the desired change in activity of the blowing agent. And the amount of colorant should be that needed to provide the desired color or shading to the pattern printed in the textured surface. The amount of softening agent has been discussed hereinabove.

For achieving the aforementioned, it is recommended that the composition comprise at least about 10 wt. % of the film-forming resin and at least about 3 wt. % of the modifier, and that the colorant and softening agent, when used, comprise respectively at least about 3 wt. % and 1 wt. % of the composition. It is believed that the following formulation will be effective for use in most applications: (A) about 10 to about 40 wt. % of the film-forming resin; (B) about 3 to about 40 wt. % of the modifier; (C) 0 to about 45 wt. % colorant; (D) 0 to about 5 wt. % of softening agent; and (E) about 10 to about 40 wt. % water, and when a softening agent is used, the amount of modifier should be at least about 3.5 times the amount of softening agent.

The composition of the present invention can include one or more additives that can be added directly to the composition or as an associated constituent of the film-forming resinous constituent or of the colorant constituent. Some examples of such additives include plasticizers, stabilizers, dispersion aids, drying aids, viscosity-control additives, buffering agents, pH adjusters, coalescing agents and emulsifying agents. The amount of any one of such additives will typically not exceed about 2.5 wt. %, the total amount of the additives generally being no greater than about 5 wt. %, based on the total weight of the embossing composition.

As mentioned above, one of the advantages of the present invention is that it is capable of being formulated in a stable state over a broad pH range. For most applications, it is believed that a pH within the range of about 6.5 to about 12 will be satisfactory. It is preferred that the pH of the composition be about 6.5 to about 9. The pH of the composition can be adjusted, if necessary, by use of mineral acids or alkali metal hydroxides.

According to the invention, embossing compositions described herein can be formulated at a viscosity level which permits the composition to be used in a variety of applications. As previously noted, the compositions are particularly suitable for use in rotogravure applications in which the embossing composition is patterned onto a foamable gel by rotogravure printing cylinders. These cylinders have been long used for printing organic-based embossing compositions and represent a major capital investment to the industry. In these applications, cylinders studded with printing cells of a typical depth of from about 50 to about 60 microns are used to apply organic-based embossing compositions to the substrates comprising foamable gels. Such cylinders cannot be used effectively with aqueous-based embossing compositions as a practical matter because the amount of time required to evaporate water from the film applied to the substrate is much longer than the time required to evaporate typically used organic solvents. In order to afford sufficient time for evaporation from the film of the water constituent, it is possible, but not desirable, to decrease the speed of the printing line. In an effort to avoid or offset this problem, the depths, and therefore the volumes, of the printing cells can be decreased so that a lesser amount of embossing composition, and thus less water, is printed onto the substrate. The smaller the amount of water, the shorter the drying time. However, this approach to the problem requires the use of higher concentrations of modifiers in the aqueous-based embossing composition so that application of the composition from the modified (smaller volume) cylinders applies the same amount of modifier onto the foamable gel for acceptable embossing effects. At alkaline pH, however, the requisite amount (typically 15–30 wt. %) of popularly used modifiers, such as benzotriazole, cannot be dissolved in the aqueous-based composition, except by use of solubilizing agents, usually organic solvents such as lower alcohols, as described in the aforementioned Hamilton patents. Unfortunately, the use of such solubilizing agents results in embossing compositions having viscosities unacceptably low for rotogravure printing, typically below about 100 cp (Brookfield @74° F.). Experience has shown that in order to avoid problems that are encountered when using such low-viscosity compositions in rotogravure printing, the viscosity thereof should be at least about 600 cp, and preferably are at least about 700 cp (each Brookfield at 74° F.). Attempts to increase the viscosities of aqueous-based compositions containing organic liquid solubilizing agents to acceptable levels for this and comparable applications have been largely unsuccessful. For example, the use of thickeners has typically resulted in poor-quality embossing compositions.

The present invention overcomes these difficulties by an entirely new approach. Compositions according to the invention containing relatively high concentrations of modifier (for example, about 15 to about 30 wt. %) in finely-divided particle form can be formulated readily with viscosity values in the range of about 600 to about 1000 cp. And this can be accomplished without having to add viscosity modifiers to the composition to increase the viscosity to acceptable levels. Accordingly, compositions within the scope of the present invention are entirely suitable for rotgravure applications in which cylinders of relatively shallow cell depth are employed. For example, such compositions are useful in embossing processes employing electromechanically engraved cylinders having cell depths of about 18 to about 42 $\mu$ because they can be formulated to contain a relatively high concentration of modifier, for example, at least about 17 wt. % and ranging up to about 30–40 wt. %. Normal printing speeds (for example, about 150 to 300 feet per minute) are thereby attainable. In general, the shallower the depth of the cell, the higher should be the concentration of the modifier.

If there are applications for which higher viscosity compositions are needed, conventional thickeners, for example, amorphous silica gel, can be usefully added in an amount sufficient to obtain the desired viscosity.

The foamable polymeric material to which the water-based embossing composition of the present invention is applied comprises a resin and a blowing agent, with or without accelerator or inhibitor. Poly(vinyl chloride) is the most popularly used resin in the industry, although there can be used other resins such as, for example, other vinyl chloride polymers, including copolymers thereof, and resins such as polyurethanes, polystyrenes and polyamides. The foamable polymeric material is preferably made from a plastisol which comprises resin solids dispersed in liquid plasticizer. Examples of plasticizers include dioctyl phthalate, butyl benzyl phthalate, di-(2-ethyl hexyl) phthalate and tricresyl phosphate. The blowing agent, which is a compound that liberates an inert gas upon being heated, is typically azodicarbonamide, this being a widely used blowing agent in industry. However, in accordance with knowledge in the art, there can be used other blowing agents, for example, bis-(p-hydroxybenzenesulfonyl) hydrazide, azobisisobutyral-nitrile and diazoaminobenzene. As previously noted, the blowing agent can be combined with an accelerator or inhibitor which modifies the properties of the blowing agent. Examples of such materials include zinc oxide, dibasic lead phosphate, and zinc octoate.

In its most widely used form, the foamable polymeric material is prepared from a composition comprising a blowing agent system and one or more resins dispersed in a liquid medium, for example, a plastisol. The aforementioned Nairn et al patent contains an extensive discussion of the preparation of such foamable materials and cites numerous examples of resins, plasticizers, and blowing agents and materials which have an effect on the blowing agent.

For use as a flooring material, the liquid resin composition comprising the blowing agent and plastisol and optional ingredients, for example, fillers, pigments, and stabilizers, is then usually applied to a substrate which functions as a carrier or backing for the composition. Such a substrate can comprise a felt material, a polymeric material or a fiber-reinforced material, including, for example, fibers of asbestos, glass, and natural and synthetic fibers. After the liquid resin composition is applied to the substrate, the resulting composite is heated to a temperature sufficiently high to gel the liquid, but at a temperature below that at which the blowing agent is activated.

The embossing composition of the invention can be applied in an appropriate design to the gelled foamable polymeric material to achieve the desired visual effect. Several applications are customary for multicolored effects. The composition may be applied in separate runs without modifier or with a clear embossing composition to respectively color areas without embossing or to emboss areas without coloring.

As disclosed in the aforementioned Nairn et al patent, it is also possible to prepare the embossed article by applying the embossing composition to a supporting base or on the underside of a layer of the foamable composition.

Although the composition of the invention is particularly adapted to application by rotogravure techniques, other printing methods, including, for example, off-set gravure, flexographic processes, screen printing or relief printing, can be used also. The present invention can be used also to excellent advantage in the fabrication of a "transfer sheet" for use in a transfer printing process of the type described immediately below.

The aforementioned description of the use of the present invention entails the initial application of the involved compositions directly to the surface of the foamable polymeric material. For use in a transfer printing process, the compositions are not applied initially to the foamable polymeric material, but instead to the surface of a support sheet. The support sheet, having printed thereon the embossing composition in predetermined fashion, is known as a "transfer sheet" which can be used by superposing it on the foamable polymeric material in a manner such that the embossing composition is contacted with the surface of the polymeric material. Thereafter, the support sheet is peeled away or stripped from the surface of the foamable composition leaving thereon the embossing composition in the desired pattern. Typically, heat and pressure are applied to the multi-ply structure comprising the support sheet having thereon the embossing composition and the foamable composition to ensure transfer of the embossing composition from its support sheet to the surface of the foamable composition. An example of a transfer printing process of this type is described in U.S. Pat. No. 4,482,598, the disclosure of which is incorporated herein by reference.

There are various factors which provide incentives for use in industry of the transfer printing process in the manufacture of textured floor coverings and the like. By way of background, it is noted that rotogravure printing cylinders which are used in the rotogravure process for applying embossing compositions of the type described herein are relatively expensive. Accordingly, there is an economic advantage to being able to utilize such printing cylinders to apply embossing compositions to transfer sheets which can be shipped more economically than final product to distant sites where the transfer sheet can be used to make final product. Stated simply, use of a transfer sheet of the type described herein permits a manufacturer to make the ultimate product without having to invest in printing facilities and printing cylinders which can comprise a high proportion of the overall investment needed to make final product.

Although the transfer printing process of the type described above has been known for several years, it has not been capable of being used effectively with heretofore known water-based embossing compositions because such compositions, otherwise effective for practical use, have been unstable. The modifier in the embossing composition loses its effectiveness.

As mentioned above, embossing compositions within the scope of the present invention can be formulated in a form which is highly stable over extended periods of time, including many months. This enables a party to fabricate a transfer sheet and ship it, for example, by low cost ocean freight to countries where moneys for capital investment are at a premium. There it can be used in the manufacture of floor coverings or similar products which otherwise might not be made because of the high capital investment needed for the manufacture and purchase of rotogravure facilities printing cylinders.

Turning now to a more detailed description of the transfer printing sheet of the type to which the present invention relates, it comprises two essential components, namely, a support sheet and adhered to the surface thereof an embossing composition of the present invention in a desired pattern. It is believed that the transfer sheet will be used most widely in a form which includes also a release layer sandwiched between the support sheet and the embossing composition. Such release layer permits the support sheet to be more readily peeled or stripped from the transfer sheet leaving behind the embossing composition on the surface of the foamable polymeric composition.

Any suitable material can be used for the support sheet, including, for example, plastic film, metal foil or a paper or paper-like material. Examples of such materials include polyethylene, polypropylene, polystyrene, poly(vinyl chloride), and kraft paper.

The release layer, if used, can be formulated in accordance with techniques available in the art. For example, the release layer can be formed from a composition comprising a release agent, for example, a wax or silicon, and a liquid carrier for the release agent, for example, an aqueous dispersion of resin solids (latex) or a cellulose derivative. Examples of such materials include latices of styrene or acrylic resins, or cellulose acetate or ethyl cellulose. The composition used to form the release layer can include also additives, for example, plasticizer, filler, or surfactant.

The release composition can be applied to the support sheet by any suitable means, for example, spray, brush, or roll coating, or extrusion. The amount of release composition applied to the support layer is that sufficient to form a release layer of desired thickness, for example, about 1 to about 50 microns.

The embossing composition can be applied to the surface of the support sheet or to the surface of the release layer when it is used by the use of a rotogravure printing cylinder or by other suitable means.

After the transfer sheet has been superposed in contact with the surface of the foamable polymeric composition, transfer of the embossing composition from the transfer sheet to said surface is generally effected by application of heat and pressure to the composite structure. In general, there are used relatively low temperatures and pressures, for example, pressures of about 8 to about 70 kg/cm$^2$ and temperatures of about 150° to about 220° C. depending on the apparatus used. Such apparatus can comprise a pair of opposing rolls, one of which is a heated roll or a heated press.

After transfer of the embossing composition to the surface of the foamable polymeric composition and removal of the support sheet, the polymeric composition can be heated to effect foaming and embossing thereof according to available techniques.

Various modifications to the aforementioned transfer printing process can be made to achieve desired results. For example, as described in aforementioned U.S. Pat. No. 4,482,598, a purely decorative pattern may also be applied to the transfer sheet in addition to the embossing composition.

Examples which follow are illustrative of the practice of the present invention.

EXAMPLES

Example No. 1

An embossing composition according to the invention was formulated from a commercially available, film forming resin (W-B Clear 59-995, available from RBH Dispersions) and tolyl triazole micro-Jet powder, as modifier, by first admixing the resin clear and amorphous silica gel (dispersing/anti-blocking agent, sold under the trademark SYLOID 308 by Davison Chemical) and adding to the resulting mixture the tolyl triazole micro-jet powder (average particle size 75 $\mu$) with agitation for 12 to 15 minutes. A fluorescing agent (optical brightener), sold under the trademark LEUCOPHOR BMB by Sandoz, was added for the purpose of highlighting defects that might be present in the product. The composition included also a viscosity modifier (chemical identity unknown) supplied by RBH Dispersions.

The resulting embossing composition comprised the following:

| Component | % by Weight |
| --- | --- |
| film-forming resin | 33.1 |
| tolyl triazole | 25.0 |
| silica gel | 2.5 |
| fluorescing agent | 0.2 |
| isopropyl alcohol | 4.0 |
| diethylaminoethanol | 1.0 |
| viscosity modifier | 0.2 |
| surfactants | 1.0 |
| water | 33.0 |
| | 100.0 |

The viscosity of the composition was 860 cp (Brookfield @ 74° F.). Unless stated otherwise, viscosity values herein are Brookfield @ 74° F.

The next two examples also show embossing compositions within the scope of the present invention. They are similar to the composition of Example No. 1.

Example No. 2

| Component | % by Weight |
| --- | --- |
| film-forming resin | 39.00 |
| tolyl triazole | 12.50 |
| silica gel | 2.50 |
| fluorescing agent | 0.25 |
| isopropyl alcohol | 4.66 |
| diethylaminoethanol | 1.27 |
| surfactants | 1.27 |
| water | 38.55 |

-continued

| Component | % by Weight |
|---|---|
| | 100.00 |

The viscosity of the composition was 800 cp.

Example No. 3

| Component | % by Weight |
|---|---|
| film-forming resin | 31.05 |
| tolyl triazole | 30.00 |
| silica gel | 2.50 |
| isopropyl alcohol | 3.72 |
| diethylaminoethanol | 1.00 |
| surfactants | 1.00 |
| water | 30.73 |
| | 100.00 |

The viscosity of the composition was 850 cp.

Example No. 4

The next example shows an embossing composition of the present invention which is similar to the compositions of Example Nos. 1 to 3, but it includes a different modifier. The average particle size of the modifier is the same as that of the modifier of Example Nos. 1 to 3.

| Component | % by weight |
|---|---|
| film-forming resin | 35.65 |
| benzotriazole | 20.00 |
| silica gel | 1.95 |
| isopropyl alcohol | 4.25 |
| diethylaminoethanol | 1.15 |
| surfactants | 1.15 |
| water | 35.85 |
| | 100.00 |

The viscosity of the composition was 800 cp.

The next three examples are illustrative of colorant-containing embossing compositions of the present invention. They were prepared by adding pigments to the composition of Example No. 2. The sources of the pigments were pigment pastes which are proprietary to the seller thereof, namely RBH Dispersions.

| | EXAMPLE NO. | | |
|---|---|---|---|
| | 5 | 6 | 7 |
| Constituents, wt. % | | | |
| composition of Ex. No. 2 | 97.84 | 98.37 | 99.00 |
| red pigment paste | 0.90 | 0.30 | 0.40 |
| yellow pigment paste | 0.68 | 0.47 | 0.43 |
| black pigment paste | 0.58 | 0.86 | 0.17 |
| Properties | | | |
| pH | 7.51 | 8.17 | 7.9 |
| viscosity, cp @ 80° F. | 790 | 820* | 800 |

*measured @ 82° F.

The composition of Example No. 2 from which the embossing inks of Example Nos. 5 to 7 were prepared was stored for two months prior to its being used as the base material for the preparation of the inks. The composition remained stable during this storage period. The embossing inks prepared from the stable composition are capable of being used effectively in embossing applications as manifested by the effectiveness of the modifier in deactivating a zinc oxide accelerator associated with azodicarbonamide blowing agent in a gelled poly(vinyl chloride) composition plasticized with dioctylphthalate.

The next example shows an additional colorant-containing composition within the scope of the present invention. The film-forming resin of the composition and the sources of the pigment and other constituents are the same as those of the compositions of the previous examples.

Example No. 8

| Component | % by Weight |
|---|---|
| film-foaming resin | 35.50 |
| tolyl triazole | 17.53 |
| silica gel | 2.44 |
| fluorescing agent | |
| isopropyl alcohol | 4.24 |
| diethylaminoethanol | 1.16 |
| white pigment paste | 1.50 |
| red pigment paste | 0.40 |
| yellow pigment paste | 0.45 |
| black pigment paste | 0.25 |
| surfactant | 1.17 |
| water | 35.06 |
| | 100.00 |

The viscosity of the composition was 850 cp (80° F.) and the pH thereof was 8.1

The compositions of Example Nos. 1 and 8 above were used to emboss a foamable polymeric material having the formulation set forth below and being of a high gauge laboratory construction.

Foamable Polymeric Material

| Foamable Polymeric Material | |
|---|---|
| | Parts by Wt. |
| poly(vinyl chloride) - dispersion grade, inherent viscosity 0.89 | 31.0 |
| poly(vinyl chloride) - dispersion grade, inherent viscosity 0.88 | 17.0 |
| butylbenzyl phthalate plasticizer | 19.0 |
| di-(2-ethyl hexyl)phthalate plasticizer | 8.5 |
| calcium carbonate filler | 19.0 |
| aromatic petroleum solvent (boiling range 183–210° C.) | 1.5 |
| azodicarbonamide blowing agent/zinc oxide | 4.0 |
| | 100.0 |

The foamable polymeric material was gelled by heating at a temperature of about 300° F. for about 3 minutes. A portion of the surface of each of two gel samples was then printed with the composition of Example No. 1 and with the composition of Example No. 8 using an electronically engraved proof plate with 150 lines per inch (lpi) and a cell depth of 28 microns. A poly(vinyl chloride) wear layer was then applied to each of the printed gel samples. Each was then heated to a temperature of about 390° F. for about 2 minutes to decompose the blowing agent and fuse the composite material.

Measurements of each of the samples showed the following.

| | Samples Treated With Composition of | |
|---|---|---|
| | Example No. 1 | Example No. 8 |
| foam (gauge in mils) | 53.8 | 53.9 |
| wearlayer | 14.8 | 15.0 |
| embossed foam | −15.5 | −23.7 |
| embossed depth | 38.3 | 30.2 |

The above results show that satisfactory embossing of a premium construction can be achieved with shallow engraved printing plates at the modifier concentrations used.

As mentioned above, the present invention can be used to particular advantage in the production of foamed textured floor coverings. It should be understood that it can be used also to produce a variety of other kinds of products having a foamed and textured or embossed structure, including, for example, wall and ceiling coverings, table top and shelf coverings, automotive panels, book covers and decorative containers.

In summary, it can be said that the present invention provides a practical and functionally-effective means for industry to avoid the use of problem-causing hydrocarbon liquids by allowing a manufacturer to substitute in an industrial operating line, with relatively low capital investment, the use of a water-based embossing composition for an organic-based embossing composition. In addition, the excellent stability of the embossing composition of the present invention, even under poor storage conditions such as high humidity, makes the use of aqueous-based embossing compositions in transfer printing practical for the first time.

I claim:

1. A water-based embossing composition for use in chemically embossing a foamable polymeric material having a blowing agent incorporated therein comprising:
   (A) a film-forming resin dissolved or dispersed in said aqueous composition;
   (B) a modifier which is effective in modifying the activity of the blowing agent comprising particulate solids which are substantially insoluble and uniformly dispersible in the liquid medium of the embossing composition and which have an average particle size of no greater than about 100 microns, said modifier being present in the composition in an amount of at least about 3 wt. %; and
   (C) optionally, a colorant; and wherein said modifier is present in the composition in the absence of a material which is present in an amount which is effective in solubilizing the modifier.

2. A composition according to claim 1 wherein the average particle size of said modifier is no greater than about 75 microns.

3. A composition according to claim 2 wherein said particle size is about 10 to about 75 microns.

4. A composition according to claim 3 wherein said particle size is about 40 to about 75 microns.

5. A composition according to claim 1 wherein the modifier is benzotriazole or tolyl triazole.

6. A composition according to claim 1 having a viscosity of about 600 to about 1000 cps.

7. A composition according to claim 1 having a pH of about 6.5 to about 12.

8. A composition according to claim 7 having a pH of about 6.5 to about 9.

9. A composition according to claim 1 including at least about 10 wt. % of said resin and at least about 3 wt. % of said colorant.

10. A composition according to claim 1 including at least about 3 wt. % of said colorant.

11. A composition according to claim 1 comprising at least about 1 wt. % of softening agent.

12. A composition according to claim 1 consisting essentially of:
   (A) about 10 to about 40 wt. % of said film-forming resin;
   (B) about 3 to about 40 wt. % of said modifier;
   (C) 0 to about 45 wt. % of said colorant;
   (D) about 1 to about 5 wt. % of softening agent; and
   (E) about 10 to about 40 wt. % water.

13. A composition according to claim 12 including about 3 to about 45 wt. % of said colorant.

14. A composition according to claim 1 including about 20 to about 40 wt. % of said modifier.

15. A composition according to claim 14 including about 30 to about 40 wt. % of said modifier.

16. A composition according to claim 12 including about 2 to about 4 wt. % of said softening agent 17. A composition according to claim 1 including about 1 to about 5 wt. % of softening agent.

18. A composition according to claim 17 wherein the amounts of said modifier and said softening agent are such that the composition includes at least about 3.5 times as much modifier as softening agent.

19. A composition according to claim 18 wherein said amounts are such that the composition includes at least about 5 times as much modifier as softening agent.

20. A composition according to claim 18 wherein said softening agent is an alcohol.

21. A composition according to claim 18 wherein said softening agent is an alkanolamine.

22. A composition according to claim 20 wherein said modifier is a triazole, an aminotriazole or an azole.

23. A water-based embossing composition having a pH of about 6.5 to about 12 and a viscosity of about 600 to about 1000 cp for use in chemically embossing a foamable polymeric material having a blowing agent and an accelerator for the blowing agent incorporated therein consisting essentially of:
   (A) about 10 to about 40 wt. % of a film-forming vinyl or acrylic resin dissolved or dispersed in said aqueous composition;
   (B) about 3 to about 40 wt. % of a modifier which reduces the effectiveness of said accelerator so as to modify the activity of the blowing agent, said modifier being selected from the group consisting of triazoles, azoles, hydroquinone and thiourea and comprising particulate solids which are substantially insoluble and uniformly dispersible in the liquid medium of the embossing composition and which have an average particle size of no greater than about 100 microns;
   (C) about 1 to about 5 wt. % of a softening agent for the modifier solids selected from the group consisting of amines and alcohols;
   (D) optionally, a colorant; and
   (E) about 10 to about 40 wt. % water;
wherein the amount of modifier in the composition is at least about 3.5 times the amount of softening agent.

24. A composition according to claim 23 including about 3 to about 45 wt. % of said colorant.

25. A composition according to claim 24 wherein the amount of the modifier in the composition is at least about 5 times the amount of the softening agent.

26. A composition according to claim 24 having a pH of about 6.5 to about 9, a viscosity of at least about 700 cp and consisting essentially of about 20 to about 40 wt. % of said modifier and about 2 to about 4 wt. % of said softening agent, and wherein the amount of the modifier in the composition is at least about 5 times the amount of the softening agent.

27. A composition according to claim 26 wherein said particle size of the modifier is about 10 to about 75 microns.

28. A composition according to claim 24 wherein said modifier is benzotriazole or tolyl triazole and including isopropyl alcohol and/or diethylamino alcohol as a softening agent.

29. A composition according to claim 28 wherein said particle size of the modifier is about 10 to about 75 microns.

30. A water-based embossing composition which is effective in chemically embossing a foamable polymeric material having azodicarbonamide blowing agent and zinc oxide accelerator for the blowing agent incorporated therein and a viscosity of about 700 to about 1000 cp and consisting essentially of:
  (A) about 10 to about 40 wt. % of a film-forming vinyl or acrylic resin dissolved or dispersed in said aqueous composition;
  (B) about 17 to about 40 wt. % of benzotriazole or tolyl triazole modifier which reduces the effectiveness of said accelerator so as to modify the activity of the blowing agent and which comprises particulate solids that are substantially insoluble and uniformly dispersible in the liquid medium of the embossing composition and that have an average particle size of about 40 to about 75 microns;
  (C) about 2 to about 4 wt. % of an alcohol or alkylaminoalcohol softening agent for the modifier, the amount of modifier being at least about 5 times the amount of softening agent;
  (D) optionally, a colorant; and
  (E) about 10 to about 40 wt. % water.

31. A composition according to claim 23 including at least about 17 wt. % of said modifier.

32. A composition according to claim 24 including at least about 17 wt. % of said modifier.

33. A composition according to claim 31 including about 20 to about 40 wt. % of said modifier.

34. A composition according to claim 32 including about 20 to about 40 wt. % of said modifier.

35. A composition according to claim 33 including about 30 to about 40 wt. % of said modifier.

36. A composition according to claim 34 including about 30 to about 40 wt. % of said modifier.

37. A composition according to claim 23 wherein said particle size of said modifier is no greater than about 75 microns.

38. A composition according to claim 24 wherein said particle size of said modifier is no greater than about 75 microns.

39. A composition according to claim 37 wherein said particle size is about 10 to about 75 microns.

40. A composition according to claim 38 wherein said particle size is about 10 to about 75 microns.

41. A composition according to claim 39 wherein said particle size is about 40 to about 75 microns.

42. A composition according to claim 40 wherein said particle size is about 40 to about 75 microns.

43. A composition according to claim 31 wherein said particle size of said modifier is no greater than about 75 microns.

44. A composition according to claim 43 wherein said particle size of the modifier is about 10 to about 75 microns.

45. A composition according to claim 44 wherein said particle size of said modifier is about 40 to about 75 microns.

* * * * *